READ ONLY MEMORY INCLUDING FIRST AND SECOND CONDUCTIVE LAYERS FOR PRODUCING BINARY SIGNALS
Filed April 29, 1966 3 Sheets-Sheet 1

INVENTORS
EUVAL S. BARREKETTE
JOHN A. DUFFY
BY John J Goodwin
ATTORNEY 3,466,615
Patented Sept. 9, 1969

3,466,615

READ ONLY MEMORY INCLUDING FIRST AND SECOND CONDUCTIVE LAYERS FOR PRODUCING BINARY SIGNALS

Euval S. Barrekette, New York, and John A. Duffy, Yorktown Heights, N.Y., assignors to International Business Machines Corporation, Armonk, N.Y., a corporation of New York Filed Apr. 29, 1966, Ser. No. 546,334
Int. Cl. G11b *9/00*
U.S. Cl. 340—173 3 Claims

ABSTRACT OF THE DISCLOSURE

A memory element for storing binary information is provided including a first conductive layer, an insulating layer and a second conductive layer. The insulating layer and the second conductive layer are arranged in a coded pattern in rows across the first conductive layer. The memory device is read by an electron beam which scans the rows and which produces an output signal from either the first conductive layer or the second conductive layer in accordance with the pattern which represents binary information. Either output signal is representative of the binary information, however, the two signals combined produce a high amplitude composite signal representative of the binary information.

It is well recognized that information could be permanently placed on a recording device, and the information could then be later read from the recording device. For example, an electron beam may be deflected across the surface of a layer of photosensitive material, and the electron beam modulated in accordance with the information to be recorded. A photographic coded image is thus produced on the layer which may be developed and later scanned with a cathode ray or similar light beam, Binary coding may be manifested by having an opaque-to-transparent transition along the beam sweep represent a "0" bit and a transparent-to-opaque transition represent a "1" bit. Such memory devices are useful for their high information density properties. The information on a given layer is permanent, and such memory devices are referred to as "read only" since they may not be erased and rewritten upon.

Another type of recording medium used with beam encoders is thin metallic layers. The electron beam selectively etches holes in the layer and produces a coded memory analogous to punched cards or punched tape. The memory is read out by scanning the layer with a lower energy beam and sensing the beam passing through the holes. In this type system the beam is interrupted, and "absence of beam" is used as an element of the coding. The prior art systems have the characteristic that the beam produces a voltage for one coding condition versus zero voltage for the other coding condition. It would be advantageous to have a system wherein a first voltage is produced for one coding condition and an opposite voltage is produced for the other coding condition so that a greater signal differential occurs between coding conditions for a given beam intensity.

An object of the present invention is to provide an improved system for recording and reading information on a memory by an electron beam.

Another object of the present invention is to provide an improved memory device for beam recording and read out.

A further object of the present invention is to provide a memory device wherein the detection of the electron beam in the read mode is continuous for both zero bits and one bits.

The foregoing and other objects, features and advantages of the invention will be apparent from the following more particular description of a preferred embodiment of the invention, as illustrated in the accompanying drawings.

Figure 1:
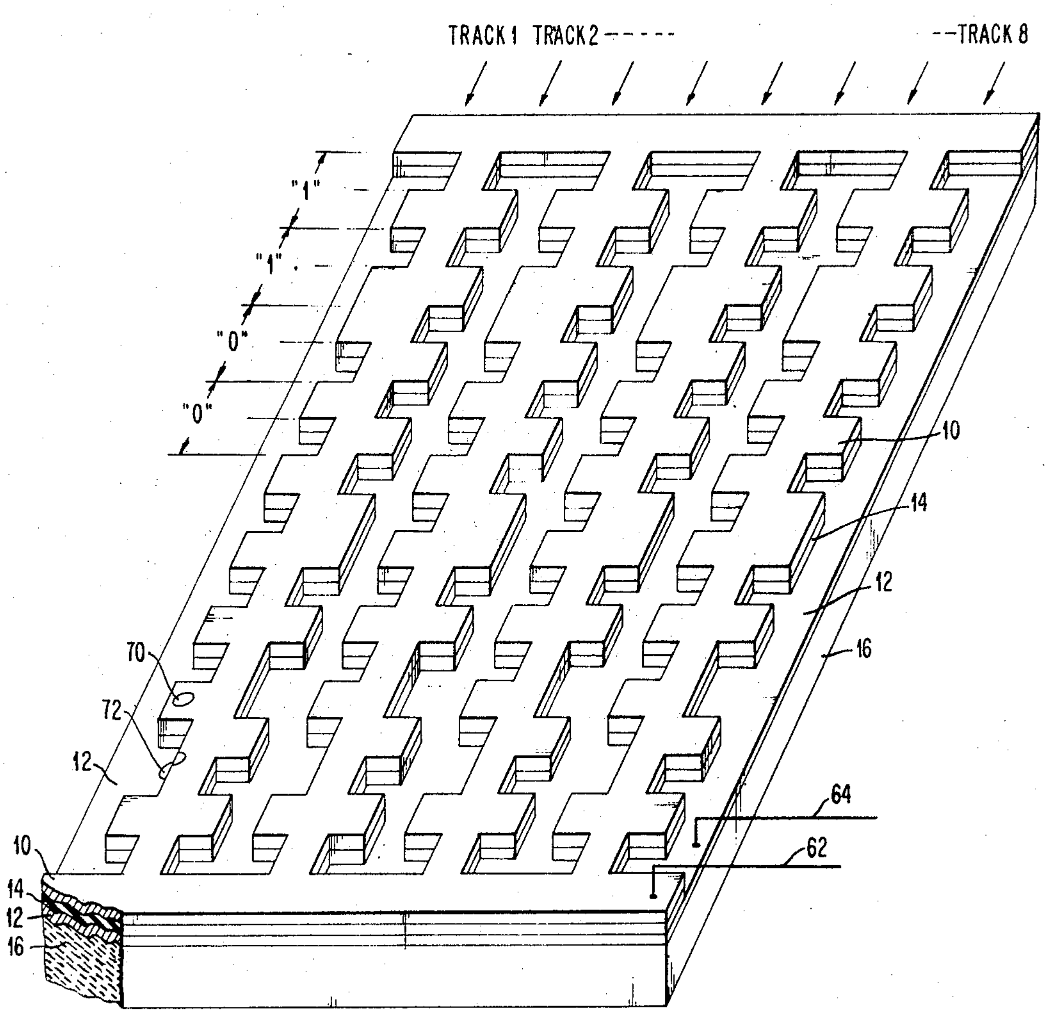
FIG. 1 is a perspective view of an embodiment of a memory device according to the principles of the present invention.

Referring to FIG. 1, the structure of the memory device is shown including a first metallic layer 10 and a second metallic layer 12 separated by a dielectric layer 14 sandwiched in between layers 10 and 12. A base layer 16 is provided as a support for the other three layers but is not entirely necessary as layer 12 may be made thick enough to provide support. In FIG. 1, layers 10 and 14 are shown containing recorded information. Prior to recording layers 10 and 14 are in the form of uniform surfaces which are continuous with and extend completely over layer 12. The metallic layers 10 and 12 are electrically conductive and are insulated from each other by the dielectric layer 14. The conductive layers 10 and 12 and the dielectric layer 14 are deposited onto base 16 by known vacuum deposition techniques. In a typical configuration layer 10 may be made of gold in the order of 1000 or less Angstroms thick over a dielectric layer 14 of silicon dioxide also 1000 or less Angstroms thick. Gold is suggested for the upper layer because it is a dense metal and therefore the upper layer may be made thin. The lower conductive layer may be gold or aluminum. The base 16 is provided for support only, and may be composed, for example, of ceramic or, as previously stated, the aluminum layer 12 may serve as the base.

Figure 2:
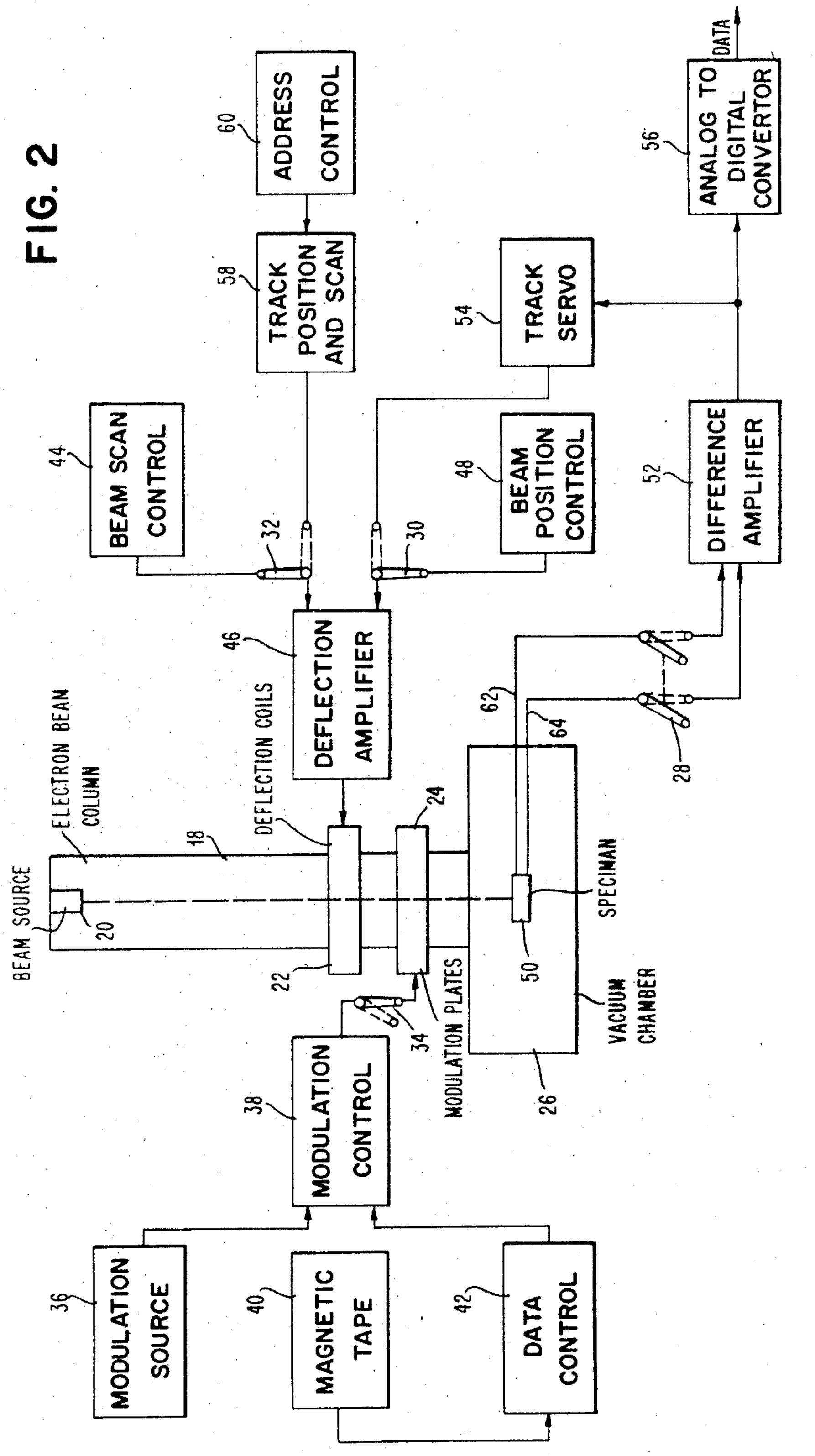
FIG. 2 is a schematic diagram of a system for recording information onto a memory device and for reading the information recorded on the memory device.

To record information on the memory device, layer 10 is coated with a photoresist and the device is inserted into an electron beam column as shown in FIG. 2. In FIG. 2 a beam column 18 is shown including a source of electron beam 20, beam deflection coils 22, modulation plates 24, and a vacuum chamber 26 in which the memory device shown in FIG. 1 is mounted.

The system shown in FIG. 2 is capable of both recording information into the memory device and reading information from the memory device. Four switches 28, 30, 32, and 34 are provided which are switched when it is desired to change from the read mode to the write mode or vice versa. Switch 28 is a ganged switch of the double pole single throw type. In the write mode a modulation source 36 is connected to a modulation control means 38 and a magnetic tape storage means 40 is connected through data control means 42 to modulation control means 38. Modulation control means 38 is connected through switch 34 to the modulation plates 24 for modulating the beam from source 20. A working figure for the value of beam intensity is, in the present example, 12 kilovolts.

A beam scan control means 44 is connected through switch 32 to deflection amplifier 46 and a beam position control means 48 is connected through switch 30 to deflection amplifier 46. Deflection amplifier 46 is connected to deflection coils 22 for deflecting the path of the beam from beam source 20.

In the read mode the four switches 28, 30, 32, and 34 are moved to the positions indicated by the dotted lines in FIG. 1. Switch 34 disconnects the modulation control means 38 from the modulation plates 24 so that the beam from source 20 is not modulated. In the read mode, the beam intensity need only be in the order of 5 kilovolts. Switch 28 connects the memory device 50 to a difference amplifier 52, which in turn is connected to a track servo means 54 and an analog-to-digital converter 56. Deflection amplifier 46 is disconnected from beam position control means 48 and is connected to track servo means 54 by switch 30. Deflection amplifier 46 is also disconnected from beam scan control means 44 and connected instead to a track position and scan means 58 by switch 32. Track position and scan means 58 are connected to an address control means 60.

The various elements shown in FIG. 2 are known in the are, with the exception of memory device 50. The beam scan control means 44 and beam position control means 48, through amplifier 46, apply signals to the deflection coils 22 of the beam column to cause the electron beam from source 20 to be deflected in a systematic manner so that it scans the surface of the memory device 50. The method of scanning may be the usual raster type wherein each track is scannned in the same direction with a flyback signal applied between track scans, or the scan may be directed up one track and down the other. In either case the deflection coils 22 cause the beam to scan memory device 50 in parallel tracks in what will be referred to as the X direction.

Modulation source 36 is a source of signal capable of modulating the electron beam in the Y direction. Magnetic tape means 40 contains the digital information to be ultimately stored on memory device 50. The digital information signals are read through data control 42 to the modulation control means 38 to selectively gate the modulation signal to the modulation plates 24. The modulation signal causes the beam to deflect a given amount in the Y direction as it is being swept in the X direction by the deflection coils 22. In the present embodiment the digital code is arranged such that the X sweep of the beam across the surface of memory device 50 is subdivided into binary digit or bit positions. In any bit position a nonmodulated sweep increment followed by a modulated sweep increment represents a "0" bit while a modulated sweep increment followed by a nonmodulated sweep increment represents a "1" bit.

Figure 3:
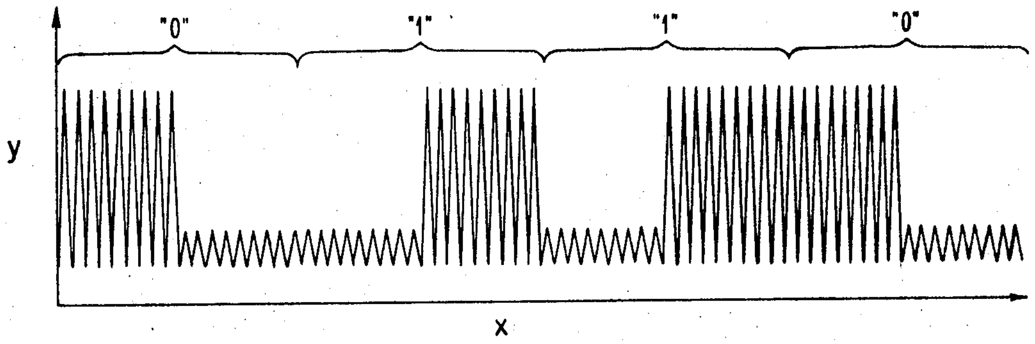
FIG. 3 is an illustration of a type of beam modulation and deflection employed in the system of the present invention.

Referring to FIG. 3, a typical trace of a modulated electron beam is shown, the deflections of the beam in the Y direction being produced by the gating of the modulation signal from source 36 by the data from the magnetic type at modulation control means 38, and the application of the modulation signal onto the modulation plates 24.

The described type of beam scanning is known in the art as the paintbrush technique. Alternative techniques such as shaped beam may be also be employed.

With the data modulated beam it is possible to scan the entire surface of the memory device 50 which, as previously stated, has been coated with a photoresist. After being scanned, the memory device is removed and processed by developing the photoresist, etching away the unexposed portion of the upper layer 10 and corresponding portions of the dielectric layer 14 in the same area. The actual etching operation will require two steps; one etching bath for removing the upper layer portions and a second etching bath for removing dielectric layer portions. Aqua regia may be used to etch the upper gold layer and ammonium bifluoride may be used to etch the silicon dioxide dielectric layer.

Another method of treating the memory device is to first coat the lower layer 12 with photoresist and expose it to the modulated beam, and develop. Layers 14 and 10 are then deposited on layer 12, after which the photoresist is stripped, and the portions of layers 14 and 10 adhering to the exposed photoresist will be removed.

Also, in the first described method, it may be possible to select materials such that layer 10 and layer 14 will be removed by a single etch bath. The resultant etched memory device is typically shown in FIG. 1. In FIG. 1 there are eight tracks shown on the surface. If an electron beam were to scan any of the tracks of FIG. 1, the beam would either fall on layer 10 or layer 12 during the scan. For example, if the first track were scanned from back to front, the beam would impinge on layer 12 then on layer 10 for the first bit position. A conductor 62 is connected to the upper layer 10 and another conductor 64 is connected to lower layer 12. When the electron beam falls on either layer it causes electrical conduction therein, so that as the electron beam scans the first bit position of track 1 a signal is first produced on conductor 64 followed by a signal on conductor 62. This is representative of a "1" bit. As the beam scans the second bit position of track 1, the beam again impinges lower layer 12 before upper layer 10 resulting in a signal on conductor 64 followed by a signal on conductor 62. This as stated is representative of a "1" bit. In the third bit position the beam impinges on upper layer 10 before lower layer 12 resulting in a signal on conductor 62 followed by a signal on conductor 64. This is representative of a "0" bit. Thus, if the entire track 1 were scanned, there would be a sequence of signals on conductors 62 and 64 representative of the bits 1, 1, 0, 0, 0, 0, 0, 0, 1.

Referring again to FIG. 2, the circuits for the read mode are shown. When it is desired to read a coded memory device, the device is placed in the vacuum chember 26 and the contacts associated with conductors 62 and 64 are respectively connected to the upper and lower metallic layers as shown in more detail in FIG. 1. The switches 28, 30, 32, and 34 are moved to the position as shown by the dotted lines in FIG. 2. This disconnects the modulation control 38 so the beam is not modulated in the read mode. The upper and lower metallic layers of the memory device 50 are electrically connected to difference amplifier 52, and track servo means 54 and track position and scan means 58 are connected to deflection amplifier 46.

The address control means 60 provides a signal related to a track location on which desired information is located. The track position and scan means 58, through the deflection amplifier 46, applies a deflection signal to the deflection coils 22 which directs the beam to positions on the surface of the memory device 50. Track position and scan means 58 are capable of providing a scan signal to deflection plates 22 which will cause the beam to scan (read out) the entire memory device or, under control of the address control means 60, can direct the beam to given portions of the memory device 50.

As a given track of memory device 50 is scanned, a signal will be present on either conductor 62 or conductor 64 depending on the particular binary coding of the track. The signals on conductors 62 and 64 are connected through switch 28 to difference amplifier 52. Difference amplifier 52 provides an output signal representative of the instantaneous amplitude difference between the signals on conductors 62 and 64.

Figure 4:
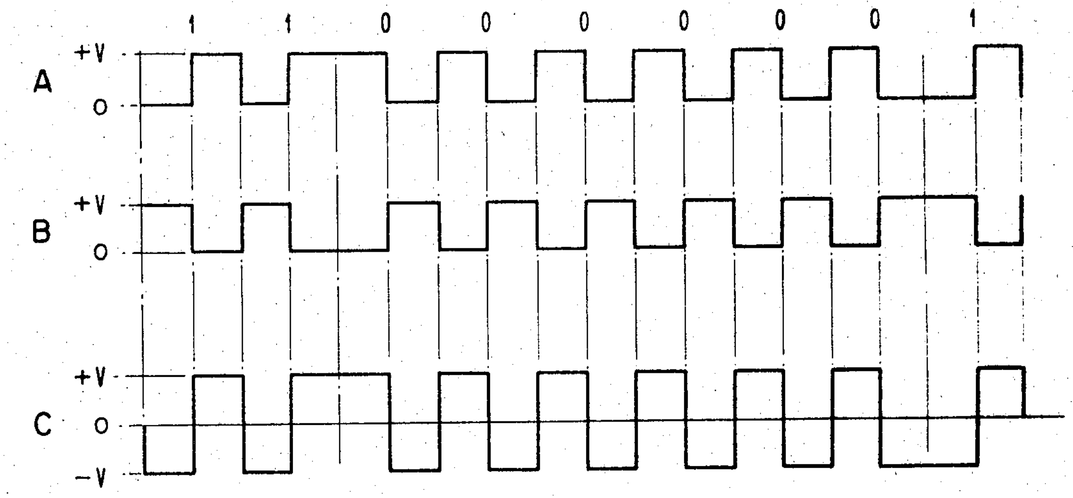
FIG. 4 is an illustration of waveforms useful in explaining the operation of the system of the present invention.

Referring to FIG. 4, waveforms are shown which depict the relationships of the signals on conductor 62, conductor 64, and the output signal from difference amplifier 52. The waveforms are representative of those obtained when the first track of the memory device shown in FIG. 1 is scanned, that is, for the binary coding 110000001. When the electron beam strikes the upper layer 10, it will be presumed that a voltage +V is produced on conductor 62 and when the electron beam strikes the lower layer 12, it will be presumed that a voltage +V is produced on conductor 64. Waveform A of FIG. 4 represents the amplitude of the signal on conductor 62 as the scanning takes place. Waveform B represents the amplitude of the signal on conductor 64 as the scanning occurs. Waveform C is the instantaneous difference between waveform A and waveform B and therefore represents the output signal from the difference amplifier 52. It will be appreciated by one skilled in the art that waveform C represents a form of binary coding known as nonreturn-to-zero, or NRZ, and that it may be decoded into conventional digital representations by analog-to-digital converter 56.

It should be noted that it is possible to derive the digital representations from either waveform A alone or waveform B alone. By deriving the digital signal from the difference waveform C, a measure of redundancy is gained, and an error in one of the information units will not cause an error in the digital output. Further, the waveform C is a stronger or enhanced signal since it varies between the levels of +V and −V. The output from difference amplifier 52 is also applied to track servo means 54. The function of track servo means 54 is to detect when the beam scan is not parallel to the tracks of the memory device and to provide a feedback signal to correct such drift.

Referring to FIG. 1, a representation of the beam spot upon the memory device is shown by spot 70. For a typical memory device, one-half a bit position may be one micron in distance, and the spot diameter may be one-half micron or less. This provides for a recording density of $1.5 \times 10^8$ bits per square inch. Spot 70 is properly positioned, that is, it is impinging upon the upper layer and is in-line with the first track. Spot 72, on the other hand, represents a drift condition where the beam scan has moved away from the direction of the track such that the beam spot falls partially on the upper layer 10 when it is intended that it should fall entirely on the lower layer 12. The effect of the beam spot falling partially on upper layer 10 is that a representative amount of signal will be generated and appear on conductor 62.

If the spot were to drift in the other direction away from the track, it would erroneously fall on a greater portion of the lower layer 12 than normal. When the spot is properly centered on the track, an average voltage is generated on both conductors 62 and 64 over a scan of a given number of bits. If the spot were to drift, either in one direction where it falls on a greater percentage of the upper layer 10, or the other direction when it falls on a greater percentage of the lower layer 12, the voltages on conductors 62 and 64 will deviate from the average over a period of scan, the voltage on one conductor increasing and the voltage on the other conductor decreasing, and vice-versa depending on the direction of the drift.

Referring to FIG. 4, the filtering of waveform A alone would provide a given average value and the filtering of waveform B alone would also provide a given average value. When drift occurs, the level of both waveform A and waveform B would deviate from average but in opposite directions. A correction signal could be obtained by comparing either waveform A or waveform B with its respective average value. However, in FIG. 2, to correct for such drift, the output signal from difference amplifier 52 is applied to track servo means 54 which contains a filter which smooths or averages the signal to produce the average value. If the beam spot were properly centered on the track, the average value of the signal would be zero. If the spot drifts, the average values of waveform A and waveform B (FIG. 4) would vary in opposite directions, and the difference between the average values would be determined which the output signal from difference amplifier 52 is filtered by track servo means 54. Track servo means 54 then provides a correction signal which is fed back through deflection amplifier 46 to return the beam from source 20 to its proper direction.

As previously stated the type of described writing and reading operations of the system shown in FIG. 1 have been employed in the prior art, and the circuits for carrying out the functions will be known to those skilled in the art. The unique feature of the present invention is the use of first and second metallic layers configured such that information may be recorded thereon by electron beam exposure and that the information may be read from both the layers by an electron beam scan which generates first and second complementary signals on separate conductors in accordance with the code configuration.

The first and second signals were described as resulting from the voltage directly produced by the impingement of the read beam on the metallic layers. Other methods of reading may also be employed, for example, the reflectivity of the secondary emission will be different for the two metallic layers, and the difference in reflectivity may be used to determine the output signal. The geometry of the device could also be used to determine the output signal. There will be a change in reflectivity when the beam scans across the walls of the etched layers, and the changes in reflectivity may be detected and provide a coded output signal.

While the invention has been particularly shown and described with reference to a preferred embodiment thereof, it will be understood by those skilled in the art that various changes in form and details may be made therein without departing from the spirit and scope of the invention.

What is claimed is:

1. A device for storing coded information comprising:
- an electron beam source,
- a multilayered memory device,
- means for directing said electron beam from said source across the upper surface of said multilayered memory device,
- said multilayered memory device including a lower conductive layer for producing signals in response to said electron beam directed thereon,
- an insulating layer mounted on portions of said lower conductive layer in accordance with a predetermined pattern to prevent said electron beam from impinging on said portions of said lower conductive layer,
- an upper conductive layer mounted on and patterned the same as said insulating layer, said upper conductive layer producing signals in response to said electron beam directed thereon,
- said multilayered memory device producing signals from either said upper conductive layer or said lower conductive layer as said electron beam is directed across the upper surface of said memory device and impinges on either said upper conductive layer or said lower conductive layer,
- said insulating layer and said upper conductive layer patterned in accordance with the binary code such that when said electron beam scans said device and impinges said lower conductive layer before said upper conductive layer in the direction of the scan it is representative of a first binary bit, and when said electron beam impinges said upper conductive layer before said lower conductive layer it is representative of a second binary bit.

2. A device according to claim 1 further including means for detecting the signals produced by said lower conductive layer and means for detecting the signals produced by said upper conductive layer,
- and means for combining the detected signals from said upper and lower conductive layers into a single binary coded signal.

3. A method for recording information on an information storing device comprising the steps of:

depositing a layer of insulating material onto a first layer of conductive material, depositing a second layer of conductive material onto said layer of insulating material, coating said second layer of conductive material with a photoresistive material, directing an information bearing modulated electron beam onto said photoresistive coated second layer in accordance with a predetermined pattern to expose selected areas of said photoresistive material for recording said information, developing the photoresistive material, and the step of etching away the portions of said second layer and said insulating layer located below the unexposed portions of said photoresistive coating.

References Cited

UNITED STATES PATENTS

| | | | |
|---|---|---|---|
| 3,226,696 | 12/1965 | Dove | 340—173 |
| 3,362,017 | 1/1968 | Brahm | 340—173 |

BERNARD KONICK, Primary Examiner

JOSEPH F. BREIMAYER, Assistant Examiner

U.S. Cl. X.R.

346—74